UNITED STATES PATENT OFFICE.

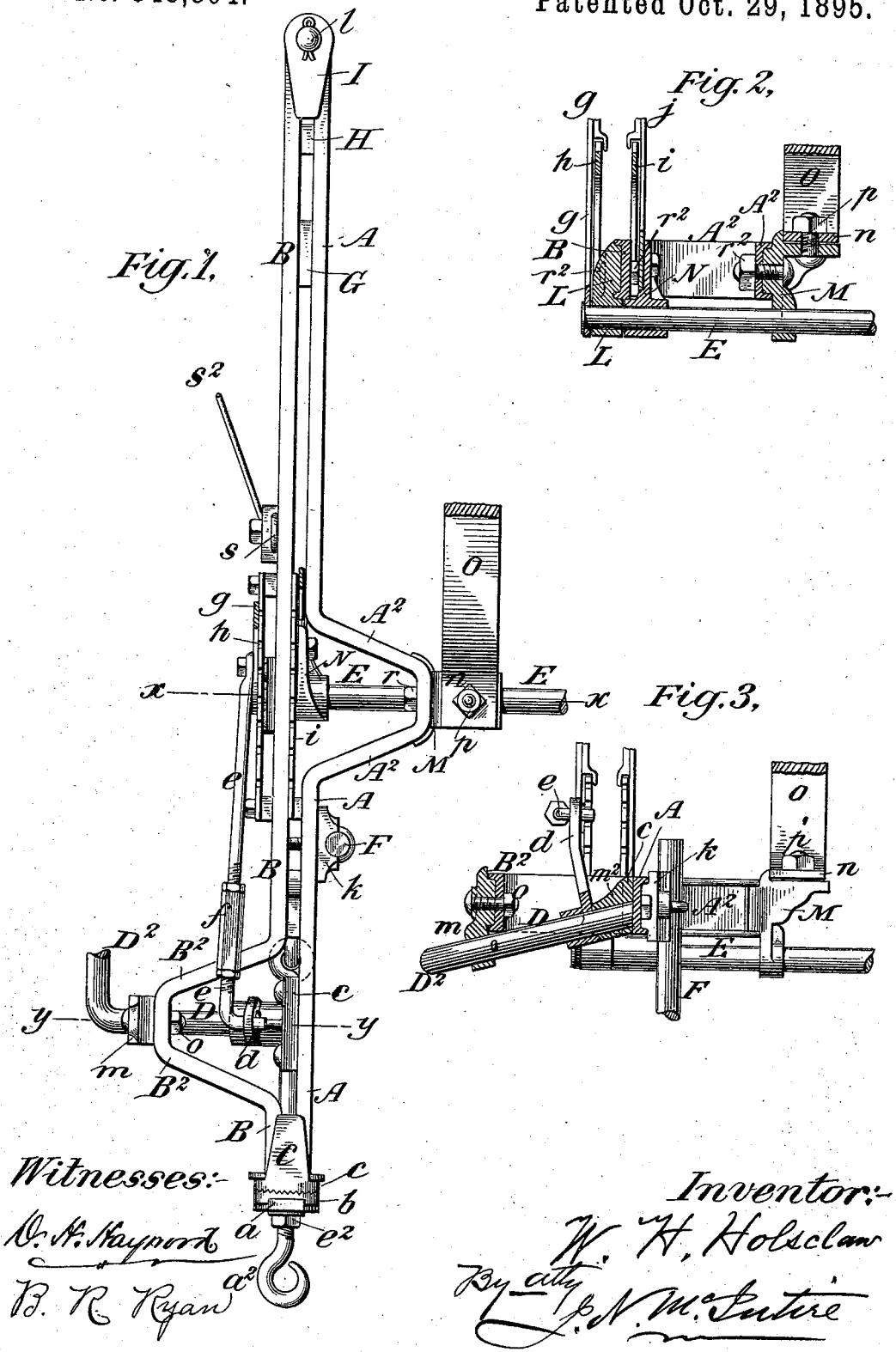

WILFORD H. HOLSCLAW, OF LOUISVILLE, KENTUCKY, ASSIGNOR TO THE
B. F. AVERY & SONS, OF SAME PLACE.

SULKY-PLOW.

SPECIFICATION forming part of Letters Patent No. 548,804, dated October 29, 1895.

Application filed June 26, 1895. Serial No. 554,066. (No model.)

*To all whom it may concern:*

Be it known that I, WILFORD H. HOLSCLAW, a citizen of the United States, residing at Louisville, in the county of Jefferson and State of Kentucky, have invented a certain new and useful Improvement in Sulky-Plows, of which the following is a full, clear, and exact description, reference being had to the accompanying drawings, forming part of this specification.

My invention relates to sulky-plows, and has for its main object to improve the construction of the combined beam and framework, which is, as usual, made of metal and which carries, besides the plow proper, the several wheels, the driver's seat, and the lever mechanisms by which the driver manipulates the wheels, &c.

As heretofore made the type of sulky-plow to which my invention relates has had the beam proper composed of two steel bars bolted together and to an intermediately-located casting at their foremost ends and somewhat similarly connected at their rear ends, while for the purposes of properly supporting in suitable bearings the crank axles or shafts, carrying at their outer ends, respectively, the furrow or canting and the other supporting wheel of the sulky, laterally-projecting castings or sort of U-shaped frame-pieces have been bolted (bracket-like) to the said steel bars, all in a manner well understood by those skilled in the art. This heretofore-practiced mode of construction of the "framework" (so to speak) of the machine involves, necessarily, certain weaknesses, structurally, by reason of having one of the bearings of each of the wheel-shafts sustained by a separate piece or part bolted to the beam-bar, and hence lacking in perfect stability and durability. Furthermore, such old method of construction is more or less complicated and expensive by reason of the use of these separate parts bolted to the beam-frame. I propose by my invention to remedy or overcome these defects in or practical objections to the heretofore-approved construction, and to this main end my invention may be said to consist in a combined beam and frame composed of suitable metallic bars, each of which is bent to produce a laterally-projecting sort of U-shaped bracket, which supports one of the bearings of one of the wheel-shafts, so that in each case the outer bearing of such shaft is sustained by a part or frame-piece that is integral with one of the said channel steel bars, all as will be more fully explained hereinafter, and as will be most particularly pointed out in the claims of this specification.

To enable those skilled in the art to make and use sulky-plows embodying my invention, I will now proceed to more fully explain the latter, referring by letter, to the accompanying drawings, which form part of this specification, and in which I have shown my improved construction in precisely that form in which I have so far actually practiced my invention.

In the drawings, Figure 1 is a top view of a machine built according to my invention, but with the usual wheels, plow, and some other parts that form no part of the improvement omitted in order to simplify the figure and make it on a large enough scale to show the invention distinctly. Fig. 2 is a vertical section at the line $x\,x$ of Fig. 1. Fig. 3 is a vertical section at the line $y\,y$ of Fig. 1.

In the several figures the same part will be found designated by the same letter of reference.

A and B are two channel steel bars, the first named of which has a bent portion $A^2$ and the other of which has a similar bend at $B^2$, the bend $A^2$ of bar A being, however, near its middle, while that $B^2$ of bar B is near its forward end. These two bars (which preferably are placed with their flanges projecting outwardly) are arranged vertically parallel to each other (during their straight portions) and with their outwardly-bent portions $A^2$ and $B^2$ positioned properly with relation to the location of the wheel shafts or axles E and D, all as clearly shown. Intermediately of the rear end portions of the two bars is arranged a casting I, and which is securely clamped between said bars and which carries the vertical spindle $l$ of an ordinary caster gage-wheel (not shown) in a well-known manner, while between the forward end portions of said bars is arranged and securely clamped in place a casting $c$, formed with a disk-like radially-serrated front end, with which is combined a similarly-serrated circular block $b$, in a vertical recess or depression of which is adjustably secured a bar or shoe-piece $a$, the said part $a$ being provided with a hook $a^2$ to hitch the team to, and it and the head-block $b$ being clamped securely to the part $c$ by means of a single bolt and nut, as seen at $e^2$, and in a known manner for the well-understood purposes.

The standard G and brace H of the plow are held between and securely bolted to the steel bars A and B in the usual manner, and to the outer surface of the right-hand bar B is fastened at $s$ the upper end of the usual plow clearer bar or finger $s^2$.

The axle E of the main or landside wheel of the sulky (not shown) is supported in two bearing or journal boxes, one of which is in the casting M, that is, as shown, securely bolted at $r$ to the outer flanged side of the bend $A^2$ of the steel bar A, and the other of which is in the cast-metal hanger L, that is securely bolted at $r^2$ to the outer surface of the outer bar B, all as most clearly seen at Fig. 2.

The casting M is formed with an upper seating-surface, on top of which is bolted at $p$ the foot portion $n$ of a spring-bar O, (shown as broken off,) which at its upper rearward end carries the driver's seat in a usual manner.

$h$ and $i$ are two semicircular rack-bars or toothed segments securely bolted, respectively, to the outer and inner sides of the bar B, and with which engage the latch-bars of the two hand-levers $g$ and $j$, by means of which the seated driver can manipulate the two crank-axles D and E in the usual manner for well-known purposes. The hand-lever $j$ is made fast at its lower end to the axle-shaft E through the medium of the hub-like device N of the said lever, keyed fast on the shaft, while the lever $g$ is pivoted at its lower end on the outer end of shaft E as a fulcrum and is coupled to the obliquely-arranged axle-shaft D of the cant-wheel (not shown) by means of a connecting-rod $e$, pivoted at its rear end to said lever and at its forward end to the upper end of a bent arm $d$, which at its lower part is keyed or otherwise made fast on shaft D, all as most easily seen at Figs. 1 and 3 of the drawings. The rod $e$ is made in two parts, which have their adjacent ends threaded and coupled by a take-up device $f$, after a fashion well known.

F is the stem or spindle-like standard of a rolling colter (not shown) adjustably secured or clamped to the bar A at $k$ in the usual manner, and $D^2$ is the rearwardly-projecting bent extension of shaft D, that carries in the usual manner the cant-wheel or canting furrow-wheel. (Not shown.)

The obliquely-hung shaft D is mounted in two journal-boxes, one of which is in a casting $m$, (see Figs. 1 and 3,) that is bolted at $o$ to the bend $B^2$ of the channel-bar B, and the other of which is in the tubular portion of a casting $m^2$, the foot or base $c$ of which is securely bolted, as shown, to the inner side of the steel bar A.

Of course the general operations of the plow, as well as that of the mechanisms for adjusting the wheels and machine, are substantially the same as usual with the species of sulky-plow to which my invention relates; but by reason of the novel feature of the bent frame portion $B^2$ I am enabled to employ in the manner shown a simpler and otherwise more desirable mechanism for operating the axle-shaft D, because by reason of having the bend $B^2$ formed of the bar B I am enabled to utilize the space heretofore occupied or obstructed by the straight bar and thus get in the tubular shaft-box at $m^2$ and the fast connection between shaft D and rocking arm $d$ in the manner shown, while at the same time utilizing to turn the shaft D, by the action of hand-lever $g$, an exceedingly simple, efficient, and durable wheel-adjusting mechanism.

With reference to both the axle-shaft D and that lettered E it will be seen that by means of the bent channel-bars A and B, formed with the integral frame-like bends $A^2$ and $B^2$, I am enabled to afford, by the use solely of these two parts or pieces, much more rigid and durable or stronger supports for the outer bearings of said shafts than can be afforded them in the heretofore-employed constructions, and it will be understood that either one of the novel forms of combined beam and frame bar might be used alone with considerable advantage, though it is of course desirable to follow out the whole plan of construction I have herein shown and described.

What I have shown and described as the novel characteristic of my improved sulky-plow may of course be embodied in a machine otherwise somewhat different from that I have shown, since this characteristic feature may easily perform all its ascribed functions and render all the advantages due to its use in a machine differing materially in many of its other features from that I have herein set forth.

Having now, however, so fully shown and described my invention that those skilled in the art can make sulky-plows embracing, either in part or in whole, my invention, what I claim as new, and desire to secure by Letters Patent, is—

1. In a sulky-plow, a combined beam and frame, composed of two metallic bars, each having an integral lateral projection, as specified, that affords, one, a support to the outer bearing of the shaft of the furrow-wheel, and the other a support to the outer bearing of the shaft of the other carrier wheel; all substantially as hereinbefore described.

2. In a sulky plow having a metallic combined beam and frame, a beam-and-frame bar A, formed with a laterally bent portion, or an integral frame-like projection, $A^2$, opposite to the straight portion of the other bar of said combined beam and frame; substantially as hereinbefore shown and described for the purpose set forth.

3. In a sulky plow having a metallic, combined beam and frame, a bar B made with a laterally bent-out portion B², located opposite a straight portion of the other bar of said combined beam and frame; the said bent portion operating to support the outer bearing box of the cant-wheel shaft; and creating a clear space between itself and the opposite straight portion of said other bill; the whole constructed and arranged as and for the purposes set forth.

In witness whereof I have hereunto set my hand this 19th day of March, 1895.

W. H. HOLSCLAW.

In presence of—
V. L. MANSFIELD,
L. M. DOW.